May 25, 1965     G. H. BINGHAM, JR     3,185,752
METHOD OF VENTING SOLE ATTACHING MOLDS
Filed Oct. 24, 1962     2 Sheets-Sheet 1
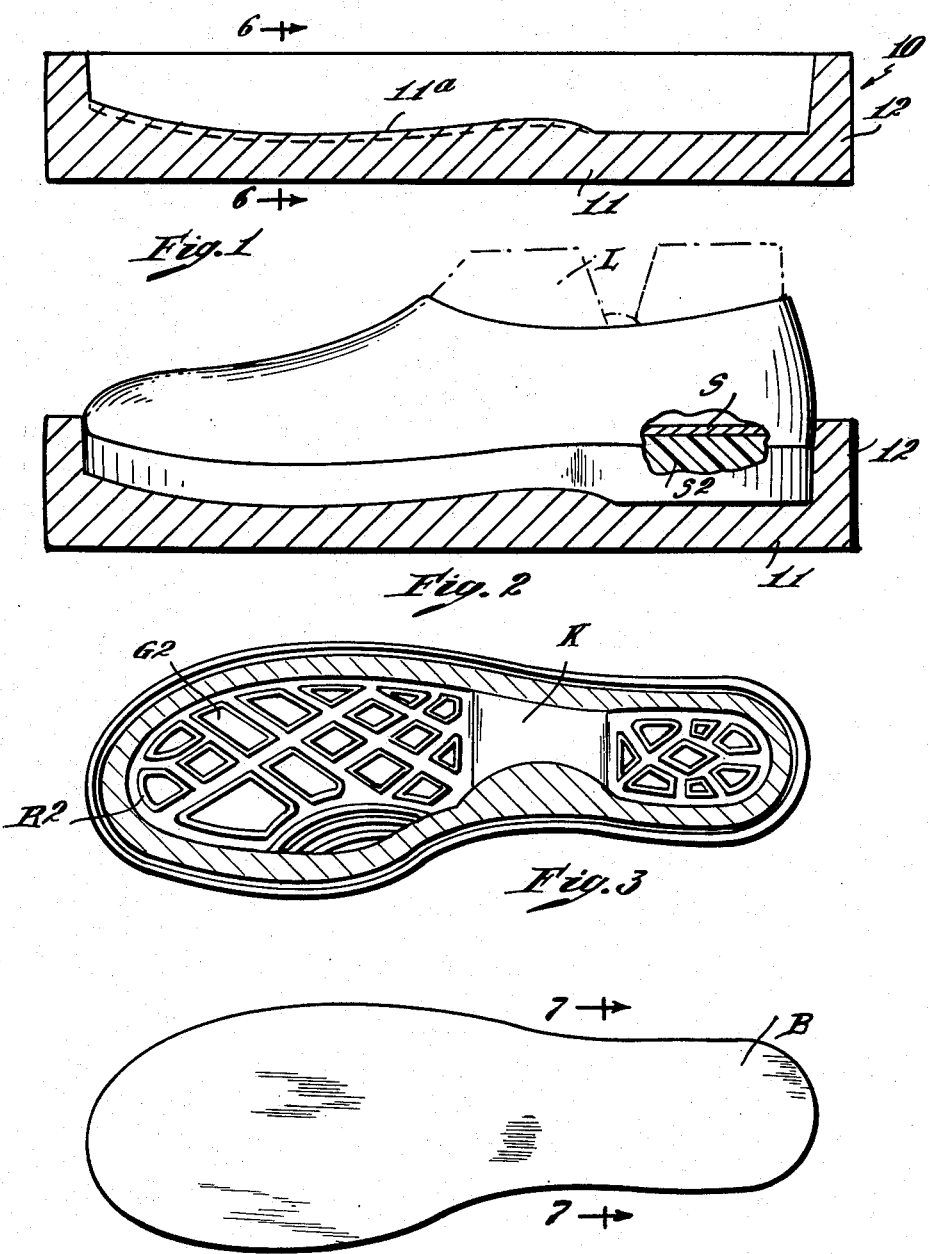
INVENTOR.
George H. Bingham, Jr.
BY
Roberts Cushman & Grover
ATT'YS May 25, 1965  G. H. BINGHAM, JR  3,185,752
METHOD OF VENTING SOLE ATTACHING MOLDS
Filed Oct. 24, 1962  2 Sheets-Sheet 2

United States Patent Office 3,185,752
Patented May 25, 1965

3,185,752
METHOD OF VENTING SOLE ATTACHING MOLDS
George H. Bingham, Jr., Westminster, Md., assignor to Cambridge Rubber Company, Taneytown, Md., a corporation of Maryland
Filed Oct. 24, 1962, Ser. No. 232,736
6 Claims. (Cl. 264—316)

This invention pertains to the manufacture of footwear, in particular, to the manufacture of outer soles of elastomeric material as, for example, a synthetic plastic, and wherein a blank of the partially cured material is placed in a rigid mold and subjected to pressure whereby to conform the lower and edge surfaces of the blank to the contour of the inner surface of the mold.

It is the custom of the shoe trade to expect such shoe soles to have a lower or tread surface of ornamental appearance, for example consisting of a design made up of ribs with intervening depressions, although oft-times, with some portions, or portions, of the tread surface left smooth or blank. The designs, thus provided, are sometimes quite intricate, consisting of or comprising very narrow ribs or area-defining walls upstanding from a depressed surface, and the shoe trade demands that the designs thus provided shall be sharp and clear and without imperfection. However, when a blank of elastomeric material in semi-cured condition is placed in the cavity of a rigid mold whose bottom surface is characterized by ribs and depressed areas which are the replica, but in reverse, of the ribs and areas to be formed on the bottom of the blank and subjected to pressure by a part having a lower surface which is brought into contact with the upper surface of the blank and high pressure is applied, the air which is trapped in the depressed areas of the mold bottom is highly compressed and tends to escape through any part of the blank which offers least resistance.

The result is that in many instances, before the blank is cured sufficiently to develop a degree of toughness sufficient to resist the pressure of such compressed air, the air may escape here-and-there across the surface of the blank thus producing fortuitous channels or irregularities in the bottom surface of the molded sole, such as to make it necessary to discard the sole or to market it as a second-grade sole.

The object of the present invention is to provide a simple procedure whereby the formation of such channels or irregularities by the compressed air is prevented. To this end, the present invention provides means operative temporarily to protect the material of the sole blank during the application of pressure, from the concentration of compressed air at any particular point, while, at the same time, providing means whereby the air is furnished with a means of escape such that it may be dissipated gradually, thereby equalizing the pressure and preventing such concentration of pressure in any given point as to damage the sole.

The means provided by the present invention for accomplishing the above results is illustrated in the accompanying drawings and more fully described in the appended specification wherein:

FIG. 1 is a diagrammatic longitudinal vertical section through a conventional rigid mold such as is used in the preparation of outer soles, according to the above suggested procedure;

FIG. 2 is a similar view of the mold, indicating, in broken lines, a lasted shoe upper with its attached outer sole which has been molded by contact with the bottom of the mold as an incident to the bonding of the outer sole to the bottom of the lasted upper;

FIG. 3 is a bottom view of the shoe shown in FIG. 2, illustrative of the type of ornamentation commonly provided at the tread surface of an outer sole of this type;

FIG. 4 is a plan view of a blank of partly cured elastomeric material such as is used in the practice of the present process;

Figure 9:
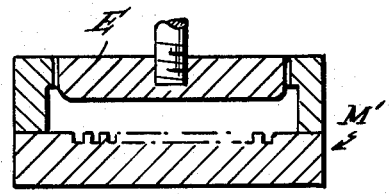
Figure 8:
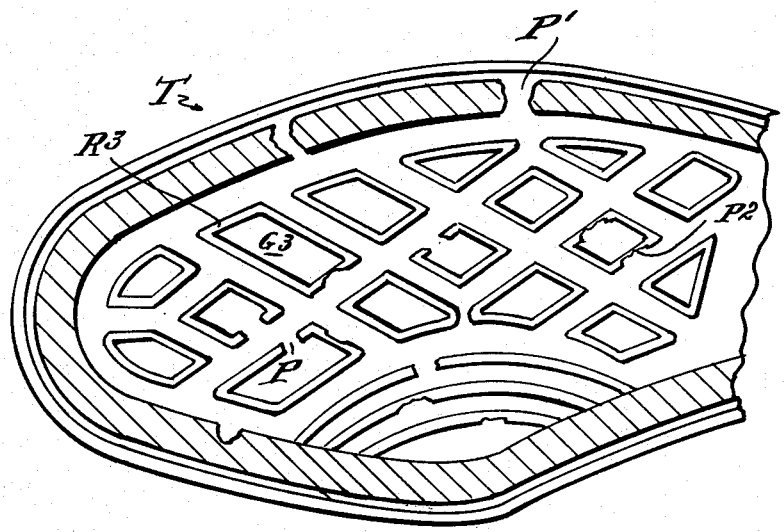

FIG. 8 is a fragmentary bottom view of an outer sole of the type above referred to, showing imperfections such as customarily result from the usual method of molding the soles; and FIG. 9 is a diagrammatic transverse section through a sole mold of conventional type, illustrative of the practice of the present invention in the manufacture of outer-soles which at some later time will be attached to a lasted shoe upper.

Referring to FIG. 1, the numeral 10 designates a mold of unitary construction comprising the bottom 11 (FIG. 6) having the contoured upper surface 11a and the side wall 12. While the mold, as thus shown, is of unitary construction, it will be understood that molds of other types, for instance, such as are customarily employed in the manufacture of shoes may be used.

Figure 6:
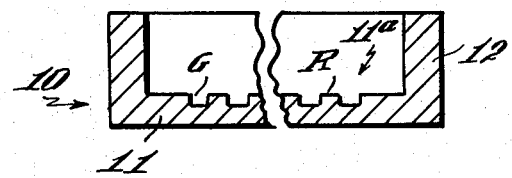
FIG. 6 is a section on the line 6—6 of FIG. 1.

As shown in FIG. 6 the upper surface 11a of the mold bottom 11 is provided with ribs R and depressed areas G, in accordance with the pattern which is to be formed on the bottom of the molded sole.

In FIG. 4 there is illustrated a sole blank B such as is employed in the process to which the present invention relates, this sole blank usually being cut by the use of a die from uncured or partially cured sheet material of the proper thickness, this being an elastomeric material which, for the purposes of the present invention, may be referred to as a "synthetic plastic." This blank is of a size and contour such as to fit within the the cavity of the mold 10 and of a thickness such as to provide an outer sole of the desired thickness, after the completion of the molding operation and after its attachment to the shoe upper.

In accordance with one embodiment of the present invention, the molding of the bottom of the outer sole takes place concomitantly with the bonding of the bottom of the lasted shoe to the upper surface of the outer sole. Thus, for example (FIG. 2) there is shown a lasted upper U mounted upon the customary last L indicated in broken lines, having its margin lasted in over the bottom of an insole S underlying the bottom surface of the last. The shoe is shown as having the outer sole $S^2$ which has been molded to shape from a blank, such as the blank B (FIG. 4) this blank having first been placed in the mold cavity, the bottom of the lasted shoe then having been placed in contact with the upper surface of the blank, and then heavy pressure having been applied to the last L while the mold 10 was heated so as to shape the bottom surface of the blank to the contour of the inner surface of the mold cavity and, at the same time, causing the bottom of the lasted shoe to become permanently bonded to the upper surface of the blank. Assuming that the bottom surface of the mold is of the proper pattern, the bottom of the shoe, when withdrawn from the mold, would have the appearance illustrated in FIG. 3, wherein there is a distinct pattern formed by downwardly projecting ribs $R^2$ and intervening depressed areas G² and with certain areas, such as those indicated at K which are plain or smooth. The pattern shown in FIG. 3 is merely by way of illustration and suggestive of a type of pattern which is commonly employed.

In FIG. 8 there is shown an outer sole T having a pattern comprised of downwardly directed ribs R³ and intervening areas G³, but it will be noted that here-and-there certain of the ribs, as indicated, for instance, at P, P¹ and P², are imperfect. This is the result of the pressure of air trapped within some of the depressed areas in the mold bottom beneath the blank and whose pressure became sufficient, before the ribs of the sole bottom had been completely cured to enable the air to break through the rib and escape across the rib into an intervening channel in which the pressure was not quite as great. Such a sole would be unsalable as a first-grade outer sole.

Figure 7:
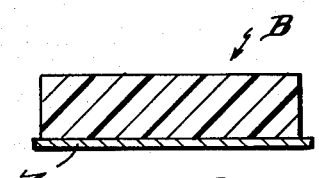
FIG. 7 is a transverse section, for example, on the line 7—7 of FIG. 4, but showing the blank of FIG. 4 assembled with the device of FIG. 5.

In accordance with the present invention there is provided a protective element which is associated with the blank B before the molding pressure is applied. This element Z (FIGS. 5 and 7) is of sheet material of a type commonly known as "cellulose wadding," or very thin and finely creped paper of cellulosic stock, for example of the weight of the order of 0.053 to 0.057 ounce per square foot, such as is sold under the trade name Kimpak by Baltimore Warner Company of Baltimore, Maryland. Such materials may be obtained in rolls from which pieces of suitable size and shape may be cut by the use of dies.

Figure 5:
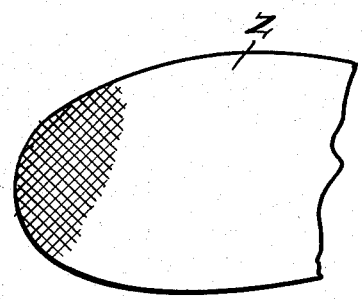
FIG. 5 is a fragmentary plan view of a sheet of thin material which, in accordance with the present invention, is employed for the purpose of preventing damage to the bottom of the shoe sole by the compressed air trapped in the mold.

From this material, in accordance with the present invention, a piece Z is cut, for instance by the use of the same dies which are employed in cutting the sole blank B, so that the protective element Z is of the same size and contour as the blank, although, if desired, the protective element may be cut by a die such that the protective element is slightly larger than the sole blank. Material, such as that above described, for use in forming a protective element and which comprises very short cellulosic fibers, apparently disintegrates in response to the curing pressure and temperature and, as a separate entity, disappears. Having prepared a protective element Z, such as shown in FIG. 5, of a predetermined size and contour, this element may merely be laid in the bottom of the mold cavity prior to the introduction of the sole blank, or it may be assembled with the sole blank B and secured thereto by means of adhesive so that the sole blank B and this protective element Z may be handled as a unit for placing in the mold cavity.

While the exact reason for the beneficial effects obtained by the employment of such an element Z are not certainly known, it is assumed that they may be in part due to the fact that this material has at least a certain degree of tenacity which may be just sufficient to assist the uncured plastic in resisting the tendency of the compressed air to break through a rib so as to cross from one depressed area to another, or, on the other hand, its action may be to provide, by reason of its porosity, a multitude of minute escape passages through which the air may pass, thus equalizing the pressure in the several channels of the mold without damaging the soft plastic material, so as thus to avoid breakdown of the ribs by unequal air pressure before the plastic has been toughened by curing.

In any event, it is found that the employment of such material, as just described and in the manner suggested, is effective in preventing the formation of such imperfections in the ribs comprised in the pattern area of the sole bottom, as have customarily been encountered in accordance with previous practice.

While in the above description the invention has been particularly described in connection with the molding of an outer sole as a concomitant to its attachment to the bottom of a lasted shoe, it is obvious that it may likewise be employed in the molding of outer soles as independent elements which would, at some later period and by some other procedure, be secured to the bottom of a lasted shoe. In that case, after placing the assembled blank B² (FIG. 9) and protective element Z² in the cavity of a mold M¹ (FIG. 9) the upper surface of the blank would be subjected to pressure by a suitable platen E, usually heated, so as to conform the bottom of the blank to the bottom plate of the mold cavity while, at the same time, completing the curing of the blank. The use of the protective element Z under such conditions has the same effect as above described in insuring a sharp and unblemished impression of the bottom of the mold cavity in the tread surface of the completed outer sole.

While certain desirable steps have been herein suggested in the practice of the present invention together with certain desirable materials, it is to be understood that the invention is broadly inclusive of any other sequence of steps and of the use of any materials which are the equivalent of those set forth in the appended claims.

I claim:

1. That method of preparing an outer sole whose tread surface is provided with a design consisting of downwardly directed ribs with intervening channels, said method comprising as steps: providing a conventional mold having a cavity of the size and contour of the outer sole to be made and whose bottom is provided with ribs and depressed areas arranged to form a pattern like that of the desired outer sole, but in reverse, providing a blank of moldable material such that, when cured, it has the desired characteristics of the outer sole to be made, said blank being of a size and contour such as to fit within the cavity of the mold and to provide an outer sole of the desired thickness, providing a protective element of sheet material which is of a porous nature but which, when confined between the bottom of the mold cavity and the blank and subjected to the blank-curing operation, disintegrates and loses its entity as an independent element, assembling said protective element with the underside of the blank and placing the assembly within the mold cavity, and then subjecting the blank to downward pressure, uniformly distributed over its upper surface, while exposing the blank to a curing temperature, thereby conforming the bottom of the blank to the ribs and depressed areas of the mold bottom, the porosity of the protective element being such, during the early stages of curing, that the air which is compressed in the depressed areas in the mold bottom distributes itself substantially uniformly among several depressed areas thereby to prevent excess pressure at any point from breaking down a rib of the outer sole which is being shaped before said rib has become sufficiently cured to prevent such breakdown.

2. The method of preparing an outer sole of elastomeric material and whose tread surface is provided with a pattern comprising depressions and elevations, said method comprising as steps: providing a blank of moldable material which, when fully cured, has the characteristics of the desired sole; assembling with said blank a protective element of creped cellulosic material of a weight of the order of 0.053 to 0.057 ounce per square foot, said element being of a size and shape to cover the undersurface of the blank; placing the assembled blank and protective element in a conventional mold having a bottom wall surface contoured like that of the undersurface of the desired sole, but in reverse, and with the protective element in contact with said bottom wall surface; and subjecting the assembly to pressure and heat such as to shape and cure the blank while the protective element functions to prevent excessive air pressure in the mold bottom from breaking through any of the elevations from one depression to another.

3. That method of providing an outer sole of elastomeric material with a tread surface having a pattern comprising spaced, downwardly projecting cavity-defining elements, said method comprising as steps: providing a conventional mold having a rigid bottom surface which is a replica, but in reverse, of the tread surface pattern of the sole to be made, providing a partially cured blank of the proper size, contour, thickness and material to form the desired outer sole, cutting from a very thin sheet of porous material a piece of approximately the same size and shape as said sole blank, arranging the sole blank within the mold with the piece of sheet material in registry with the underside of the sole blank and in contact with the bottom surface of the mold, and subjecting the blank to pressure applied to its upper surface thereby to conform its lower surface to the upper surface of the mold bottom while the air, which is trapped in cavities of the mold bottom, distributes itself uniformly among said cavities by passing through the pores of the porous sheet material.

4. The method according to claim 3, wherein the porous material is cellulosic sheet material of a weight per square foot of the order of 0.053 to 0.057 ounce, and adhesively bonding said piece of sheet material to the underside of the sole blank before arranging the latter in the mold.

5. In that method of so making an outer sole of elastomeric material as to provide the tread surface of the outer sole with a pattern defined by downwardly directed, sharply defined, narrow, area-defining ribs, by the use of a rigid, metal mold having a cavity defined by a side wall and bottom, the bottom having upstanding ribs and rib-defined cavities, the ribs and cavities forming a pattern which is the reverse of the pattern to be formed in the tread surface of the outer sole, in combination, the following steps: providing a mold having the above-named characteristics, providing a partially cured blank of the selected elastomeric material and of the proper size, coutour and thickness to form the desired outer sole, placing the blank in the mold and, while subjecting the blank to pressure, applied to its upper surface, thereby to conform its lower surface to the mold bottom, so distributing the air which is trapped within said rib-defined areas of the mold as to avoid the creation of localized high pressure at any point, transversely of the width of the mold cavity, such as to injure the downwardly directed ribs of the outer sole as they are in the process of taking shape, wherein, for distributing the air which is trapped between the blank and the mold bottom, there is introduced between the mold bottom and the blank, prior to the application of pressure, a piece of very thin porous sheet material of approximately the size and shape of the mold blank whereby air, which is trapped in the cavities of the mold bottom, distributes itself uniformly by passing through the pores of the porous sheet material.

6. That method of making an outer sole of elastomeric material and whose tread surface has a pattern defined by integral, downwardly directed elements, providing a conventional rigid mold having side walls and a bottom, the bottom having integral, upstanding elements colectively forming a pattern which is a replica, but in reverse, of the pattern which is to appear on the tread surface of the outer sole, placing within the mold a thin imperforate piece of air-pervious organic tissue of approximately the size and shape of the outer sole to be made, providing a partially cured blank of the proper size, contour, thickness and material to form the desired outer sole, placing said blank within the mold and applying heat and pressure thereby to conform the lower surface of the blank to the mold bottom, while concomitantly completing the curing of the elastomeric material and disintegrating said sheet material.

References Cited by the Examiner
UNITED STATES PATENTS 2,581,652  1/52  Goss.
2,763,028  9/56  Blake.

ROBERT F. WHITE, *Primary Examiner.*
ALEXANDER H. BRODMERKEL, *Examiner.*